US010931682B2

(12) United States Patent
Ezra et al.

(10) Patent No.: US 10,931,682 B2
(45) Date of Patent: Feb. 23, 2021

(54) PRIVILEGED IDENTITY MANAGEMENT

(71) Applicant: Microsoft Technology Licensing, LLC, Redmond, WA (US)

(72) Inventors: Shimi Ezra, Petach Tikva (IL); Natan Kfir, Petach Tikva (IL); Noam Ben-Yochanan, Petach Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/755,976

(22) Filed: Jun. 30, 2015

(65) Prior Publication Data
US 2017/0006044 A1    Jan. 5, 2017

(51) Int. Cl.
*H04L 29/06* (2006.01)
*H04L 29/08* (2006.01)
*G06F 21/31* (2013.01)

(52) U.S. Cl.
CPC ............ *H04L 63/108* (2013.01); *G06F 21/31* (2013.01); *H04L 63/102* (2013.01); *H04L 67/145* (2013.01)

(58) Field of Classification Search
CPC .......................... H04L 63/108; H04L 63/102
USPC ............................................. 726/2–7, 24–30
See application file for complete search history.

(56) References Cited

U.S. PATENT DOCUMENTS

| 4,956,769 A | 9/1990 | Smith |
| 5,151,643 A | 9/1992 | Emmert et al. |
| 5,335,972 A | 8/1994 | Jensen |
| 5,423,044 A | 6/1995 | Sutton et al. |
| 5,510,513 A | 4/1996 | Kai et al. |
| 5,526,513 A | 6/1996 | Cerutti |
| 5,564,016 A | 10/1996 | Korenshtein |
| 5,911,143 A | 6/1999 | Deinhart et al. |
| 6,023,765 A | 2/2000 | Kuhn |
| 6,289,462 B1 | 9/2001 | McNabb et al. |
| 6,546,096 B1 | 4/2003 | Meiden et al. |
| 6,601,171 B1 | 7/2003 | Carter et al. |
| 6,678,826 B1 | 1/2004 | Kelly et al. |
| 6,694,437 B1 | 2/2004 | Pao et al. |

(Continued)

FOREIGN PATENT DOCUMENTS

| CN | 1794717 A | 6/2006 |
| CN | 102307185 A | 1/2012 |

(Continued)

OTHER PUBLICATIONS

Upadhyaya et al., "Deployment of secure sharing: Authenticity and authorization using cryptography in cloud environment," 2015 International Conference on Advances in Computer Engineering and Applications Year: 2015 | Conference Paper.*

(Continued)

*Primary Examiner* — Roderick Tolentino

(57) ABSTRACT

Aspects of a privileged identity management system and method provide users with the ability to request elevated privileges to perform tasks on computing systems and software applications. The privileged identity management system and method also provides users with the ability to extend the elevated privileges to access privileged features or perform tasks using elevated privileges. The privileged identity management system and method utilize a different device that is readily available to the user in order to provide communications relating to the elevated privileges.

20 Claims, 10 Drawing Sheets

(56) References Cited

U.S. PATENT DOCUMENTS

| | | |
|---|---|---|
| 6,735,601 B1 | 5/2004 | Subrahmanyam |
| 6,804,773 B1 | 10/2004 | Grigsby et al. |
| 6,978,367 B1 | 12/2005 | Hind et al. |
| 7,062,781 B2 | 6/2006 | Shambroom |
| 7,197,638 B1 | 3/2007 | Grawrock et al. |
| 7,205,883 B2 | 4/2007 | Bailey |
| 7,257,713 B2 | 8/2007 | Colvig et al. |
| 7,269,729 B2 | 9/2007 | He et al. |
| 7,353,532 B2 | 4/2008 | Dud et al. |
| 7,418,435 B1 | 8/2008 | Sedlar |
| 7,426,654 B2 | 9/2008 | Adams et al. |
| 7,496,191 B1 | 2/2009 | Crews et al. |
| 7,506,364 B2 | 3/2009 | Vayman |
| 7,526,685 B2 | 4/2009 | Noy et al. |
| 7,607,164 B2 | 10/2009 | Vasishth et al. |
| 7,630,480 B2 | 12/2009 | Fleck et al. |
| 7,644,285 B1 | 1/2010 | Murray et al. |
| 7,673,139 B1 | 3/2010 | Satish et al. |
| 7,680,822 B1 | 3/2010 | Vyas et al. |
| 7,698,430 B2 | 4/2010 | Jackson |
| 7,702,736 B2 | 4/2010 | Duchi |
| 7,734,670 B2 | 6/2010 | Poozhiyil et al. |
| 7,813,822 B1 | 10/2010 | Hoffberg |
| 7,815,106 B1 | 10/2010 | McConnell |
| 7,831,833 B2 | 11/2010 | Gaylor |
| 7,950,051 B1 | 5/2011 | Spitz et al. |
| 7,954,152 B2 | 5/2011 | Shiran |
| 7,992,008 B2 | 8/2011 | Ashok et al. |
| 7,996,374 B1 | 8/2011 | Jones et al. |
| 8,046,558 B2 | 10/2011 | Ghose |
| 8,195,488 B1 | 6/2012 | Taix et al. |
| 8,201,224 B1 | 6/2012 | Spertus |
| 8,244,549 B1 | 8/2012 | Stener |
| 8,255,539 B2 | 8/2012 | Pierlot et al. |
| 8,296,384 B2 | 10/2012 | Pattan et al. |
| 8,296,827 B2 | 10/2012 | Paganetti et al. |
| 8,302,169 B1 | 10/2012 | Presotto et al. |
| 8,310,923 B1 | 11/2012 | Nordstrom et al. |
| 8,312,516 B1 | 11/2012 | Malatesta |
| 8,396,711 B2 | 3/2013 | Yee et al. |
| 8,402,141 B2 | 3/2013 | Seraphin |
| 8,407,776 B2 | 3/2013 | Somani et al. |
| 8,438,647 B2 | 5/2013 | Jevans |
| 8,442,960 B1 | 5/2013 | Meyer et al. |
| 8,458,455 B2 | 6/2013 | Anderson et al. |
| 8,458,779 B2 | 6/2013 | Valentine et al. |
| 8,649,768 B1 | 2/2014 | Gaddam et al. |
| 8,769,622 B2 | 7/2014 | Chang et al. |
| 8,769,644 B1 | 7/2014 | Eicken et al. |
| 8,793,790 B2 | 7/2014 | Khurana et al. |
| 8,839,257 B2 | 9/2014 | Lukyanov et al. |
| 8,881,249 B2 | 11/2014 | Nunn et al. |
| 8,904,206 B2 | 12/2014 | Black et al. |
| 8,966,065 B2 | 2/2015 | Barrett |
| 9,105,009 B2 | 8/2015 | MacLeod et al. |
| 9,361,602 B1 | 6/2016 | Hodges et al. |
| 9,369,433 B1 | 6/2016 | Paul et al. |
| 9,432,379 B1 | 8/2016 | Roche et al. |
| 9,436,820 B1 | 9/2016 | Gleichauf et al. |
| 9,460,303 B2 | 10/2016 | MacLeod et al. |
| 9,705,940 B1 | 7/2017 | Bhat et al. |
| 9,762,585 B2 | 9/2017 | Dani et al. |
| 10,225,152 B1 | 3/2019 | Roth et al. |
| 10,277,522 B1 | 4/2019 | Canton et al. |
| 2001/0021926 A1 | 9/2001 | Schneck et al. |
| 2002/0026592 A1 | 2/2002 | Gavrila et al. |
| 2002/0035521 A1 | 3/2002 | Powers |
| 2002/0099681 A1 | 7/2002 | Gainey et al. |
| 2002/0147801 A1 | 10/2002 | Gullotta et al. |
| 2003/0037251 A1 | 2/2003 | Frieder et al. |
| 2003/0088786 A1 | 5/2003 | Moran et al. |
| 2003/0115148 A1 | 6/2003 | Takhar |
| 2003/0123671 A1 | 7/2003 | He et al. |
| 2003/0139962 A1 | 7/2003 | Nobrega et al. |
| 2003/0229623 A1 | 12/2003 | Chang et al. |
| 2004/0017475 A1 | 1/2004 | Akers et al. |
| 2004/0049294 A1 | 3/2004 | Keene et al. |
| 2004/0088295 A1 | 5/2004 | Glazer et al. |
| 2004/0162899 A1 | 8/2004 | Dommety |
| 2004/0186809 A1 | 9/2004 | Schlesinger et al. |
| 2004/0199869 A1 | 10/2004 | Lucovsky et al. |
| 2004/0205342 A1 | 10/2004 | Roegner |
| 2004/0230530 A1 | 11/2004 | Searl et al. |
| 2005/0021352 A1 | 1/2005 | Maierhofer et al. |
| 2005/0050354 A1 | 3/2005 | Gociman |
| 2005/0089027 A1 | 4/2005 | Colton |
| 2005/0132225 A1 | 6/2005 | Gearhart |
| 2005/0154744 A1 | 7/2005 | Morinville |
| 2005/0180573 A1 | 8/2005 | Pelly et al. |
| 2005/0193041 A1 | 9/2005 | Bourbonnais et al. |
| 2005/0193196 A1 | 9/2005 | Huang et al. |
| 2005/0198348 A1 | 9/2005 | Yeates et al. |
| 2005/0204143 A1 | 9/2005 | Ellington |
| 2005/0268084 A1 | 12/2005 | Adams et al. |
| 2006/0004588 A1 | 1/2006 | Ananda |
| 2006/0005024 A1 | 1/2006 | Law |
| 2006/0005048 A1 | 1/2006 | Osaki et al. |
| 2006/0031377 A1 | 2/2006 | Ng et al. |
| 2006/0048224 A1 | 3/2006 | Duncan et al. |
| 2006/0075144 A1 | 4/2006 | Challener et al. |
| 2006/0075464 A1 | 4/2006 | Golan et al. |
| 2006/0137007 A1 | 6/2006 | Paatero et al. |
| 2006/0143685 A1 | 6/2006 | Vasishth et al. |
| 2006/0168079 A1 | 7/2006 | Shen et al. |
| 2006/0174319 A1 | 8/2006 | Kraemer et al. |
| 2006/0184675 A1 | 8/2006 | Salmre et al. |
| 2006/0206485 A1 | 9/2006 | Rubin et al. |
| 2006/0242690 A1 | 10/2006 | Wolf et al. |
| 2006/0265599 A1 | 11/2006 | Kanai |
| 2007/0016773 A1 | 1/2007 | Perlman et al. |
| 2007/0028293 A1 | 2/2007 | Boerries et al. |
| 2007/0050779 A1 | 3/2007 | Hayashi |
| 2007/0055785 A1 | 3/2007 | Stevens |
| 2007/0066358 A1 | 3/2007 | Silverbrook et al. |
| 2007/0083452 A1 | 4/2007 | Mayle et al. |
| 2007/0083928 A1 | 4/2007 | Mattsson et al. |
| 2007/0094334 A1 | 4/2007 | Hoffman et al. |
| 2007/0101434 A1 | 5/2007 | Jevans |
| 2007/0124361 A1 | 5/2007 | Lowry et al. |
| 2007/0136603 A1 | 6/2007 | Kuecuekyan |
| 2007/0143851 A1 | 6/2007 | Nicodemus et al. |
| 2007/0157155 A1 | 7/2007 | Peters |
| 2007/0180100 A1 | 8/2007 | Biggs et al. |
| 2007/0185875 A1 | 8/2007 | Chang et al. |
| 2007/0192416 A1 | 8/2007 | Gupta |
| 2007/0244899 A1 | 10/2007 | Faitelson et al. |
| 2007/0250920 A1 | 10/2007 | Lindsay |
| 2007/0260603 A1 | 11/2007 | Tuscano et al. |
| 2007/0266006 A1 | 11/2007 | Buss |
| 2007/0266135 A1 | 11/2007 | Friedland et al. |
| 2007/0289019 A1 | 12/2007 | Lowrey |
| 2007/0291945 A1 | 12/2007 | Chuang et al. |
| 2007/0294258 A1 | 12/2007 | Caldwell et al. |
| 2008/0091681 A1 | 4/2008 | Dwivedi et al. |
| 2008/0098485 A1 | 4/2008 | Chiou |
| 2008/0103916 A1 | 5/2008 | Camarador et al. |
| 2008/0123603 A1 | 5/2008 | Cai et al. |
| 2008/0123854 A1 | 5/2008 | Peel et al. |
| 2008/0127354 A1 | 5/2008 | Carpenter et al. |
| 2008/0140778 A1 | 6/2008 | Banavar et al. |
| 2008/0154774 A1 | 6/2008 | Dennison et al. |
| 2008/0155685 A1 | 6/2008 | Beilinson et al. |
| 2008/0168532 A1 | 7/2008 | Carter et al. |
| 2008/0195936 A1 | 8/2008 | White et al. |
| 2008/0222734 A1 | 9/2008 | Redlich et al. |
| 2008/0235760 A1 | 9/2008 | Broussard et al. |
| 2008/0249386 A1 | 10/2008 | Besterman et al. |
| 2008/0276098 A1 | 11/2008 | Florencio et al. |
| 2008/0287121 A1 | 11/2008 | Ebrom et al. |
| 2008/0320310 A1 | 12/2008 | Florencio et al. |
| 2009/0006867 A1 | 1/2009 | Choyi et al. |
| 2009/0048881 A1 | 2/2009 | Keane et al. |
| 2009/0055822 A1 | 2/2009 | Tolman et al. |
| 2009/0094667 A1 | 4/2009 | Habeck et al. |

(56) References Cited

U.S. PATENT DOCUMENTS

| | | |
|---|---|---|
| 2009/0104888 A1 | 4/2009 | Cox |
| 2009/0119541 A1 | 5/2009 | Inoue et al. |
| 2009/0150981 A1 | 6/2009 | Amies et al. |
| 2009/0165083 A1 | 6/2009 | McLean et al. |
| 2009/0193407 A1 | 7/2009 | Lepeska |
| 2009/0210427 A1 | 8/2009 | Eidler et al. |
| 2009/0248861 A1 | 10/2009 | Kato |
| 2009/0249284 A1 | 10/2009 | Antosz et al. |
| 2009/0271451 A1 | 10/2009 | Young et al. |
| 2009/0300711 A1 | 12/2009 | Tokutani et al. |
| 2009/0319402 A1 | 12/2009 | Manista et al. |
| 2009/0320088 A1 | 12/2009 | Gill et al. |
| 2009/0320107 A1 | 12/2009 | Corella |
| 2009/0327739 A1* | 12/2009 | Relyea ............... H04L 63/062 713/182 |
| 2009/0328023 A1 | 12/2009 | Bestland et al. |
| 2010/0005510 A1 | 1/2010 | Weber et al. |
| 2010/0011418 A1 | 1/2010 | Despain et al. |
| 2010/0017589 A1 | 1/2010 | Reed et al. |
| 2010/0023368 A1 | 1/2010 | Houba |
| 2010/0031058 A1 | 2/2010 | Kito et al. |
| 2010/0037056 A1 | 2/2010 | Follis et al. |
| 2010/0063950 A1 | 3/2010 | Joshi et al. |
| 2010/0064072 A1 | 3/2010 | Tang et al. |
| 2010/0082687 A1 | 4/2010 | Saito |
| 2010/0087941 A1 | 4/2010 | Assaf et al. |
| 2010/0088341 A1 | 4/2010 | Ah-Soon et al. |
| 2010/0091318 A1 | 4/2010 | Ferlitsch |
| 2010/0125891 A1 | 5/2010 | Baskaran |
| 2010/0146269 A1 | 6/2010 | Baskaran |
| 2010/0153695 A1 | 6/2010 | Bussard et al. |
| 2010/0169630 A1 | 7/2010 | Mirashrafi et al. |
| 2010/0169910 A1 | 7/2010 | Collins et al. |
| 2010/0174575 A1 | 7/2010 | Farrell et al. |
| 2010/0181380 A1 | 7/2010 | Trotter |
| 2010/0185451 A1 | 7/2010 | Choi et al. |
| 2010/0188287 A1 | 7/2010 | Madsen et al. |
| 2010/0205421 A1 | 8/2010 | Campbell et al. |
| 2010/0212008 A1 | 8/2010 | Jaganathan et al. |
| 2010/0218012 A1 | 8/2010 | Joseph et al. |
| 2010/0218238 A1 | 8/2010 | Mouleswaran et al. |
| 2010/0235599 A1 | 9/2010 | Akagawa et al. |
| 2010/0242041 A1 | 9/2010 | Plondke et al. |
| 2010/0250939 A1 | 9/2010 | Adams et al. |
| 2010/0257346 A1 | 10/2010 | Sosnosky et al. |
| 2010/0257579 A1 | 10/2010 | Karjoth et al. |
| 2010/0257596 A1 | 10/2010 | Ngo et al. |
| 2010/0278078 A1 | 11/2010 | Proulx et al. |
| 2010/0281059 A1 | 11/2010 | Lynch |
| 2010/0281173 A1 | 11/2010 | Vutukun et al. |
| 2010/0281546 A1 | 11/2010 | Kruse et al. |
| 2010/0287597 A1 | 11/2010 | Richins et al. |
| 2010/0306376 A1 | 12/2010 | Ward et al. |
| 2011/0023107 A1 | 1/2011 | Chen et al. |
| 2011/0041141 A1 | 2/2011 | Harm et al. |
| 2011/0061093 A1 | 3/2011 | Korkus et al. |
| 2011/0078497 A1 | 3/2011 | Lyne et al. |
| 2011/0099202 A1 | 4/2011 | Dedeoglu et al. |
| 2011/0099552 A1 | 4/2011 | Avni et al. |
| 2011/0099616 A1 | 4/2011 | Mazur et al. |
| 2011/0126111 A1 | 5/2011 | Gill et al. |
| 2011/0126168 A1 | 5/2011 | Ilyayev |
| 2011/0150267 A1* | 6/2011 | Snelling ............... G06F 21/316 382/100 |
| 2011/0166897 A1* | 7/2011 | Beckman ............... G06Q 10/02 705/5 |
| 2011/0178931 A1 | 7/2011 | Kia |
| 2011/0191254 A1 | 8/2011 | Womack |
| 2011/0191485 A1 | 8/2011 | Umbehocker |
| 2011/0208778 A1 | 8/2011 | Mellmer et al. |
| 2011/0209194 A1 | 8/2011 | Kennedy |
| 2011/0212770 A1 | 9/2011 | Ocko et al. |
| 2011/0219434 A1 | 9/2011 | Betz et al. |
| 2011/0225139 A1 | 9/2011 | Wang et al. |
| 2011/0246426 A1 | 10/2011 | Cho |
| 2011/0247066 A1 | 10/2011 | Lee |
| 2011/0252404 A1 | 10/2011 | Park et al. |
| 2011/0258683 A1 | 10/2011 | Cicchitto |
| 2011/0277017 A1 | 11/2011 | Ivanov et al. |
| 2011/0289588 A1 | 11/2011 | Sahai et al. |
| 2011/0302607 A1* | 12/2011 | Warrick ............... H04L 12/2809 725/39 |
| 2011/0302632 A1 | 12/2011 | Garrett et al. |
| 2012/0016621 A1 | 1/2012 | Tan et al. |
| 2012/0030187 A1 | 2/2012 | Marano et al. |
| 2012/0054847 A1* | 3/2012 | Schultz ............... G06F 21/33 726/9 |
| 2012/0096306 A1 | 4/2012 | Akirav et al. |
| 2012/0100670 A1 | 4/2012 | Liu et al. |
| 2012/0110055 A1 | 5/2012 | Van biljon et al. |
| 2012/0137360 A1 | 5/2012 | Henderson |
| 2012/0144234 A1 | 6/2012 | Clark et al. |
| 2012/0185911 A1 | 7/2012 | Polite et al. |
| 2012/0185933 A1 | 7/2012 | Belk et al. |
| 2012/0209884 A1 | 8/2012 | Mattsson et al. |
| 2012/0216243 A1* | 8/2012 | Gill ............... G06F 21/55 726/1 |
| 2012/0239822 A1 | 9/2012 | Poulson et al. |
| 2012/0246703 A1 | 9/2012 | MacLeod et al. |
| 2012/0259720 A1 | 10/2012 | Nuzzi |
| 2012/0266246 A1 | 10/2012 | Amit et al. |
| 2012/0311696 A1 | 12/2012 | Datsenko et al. |
| 2012/0317132 A1 | 12/2012 | Brady et al. |
| 2013/0024437 A1 | 1/2013 | Stevens et al. |
| 2013/0024918 A1 | 1/2013 | Cramer et al. |
| 2013/0024947 A1 | 1/2013 | Holland et al. |
| 2013/0031070 A1 | 1/2013 | Ducharme et al. |
| 2013/0047230 A1 | 2/2013 | Krishnan et al. |
| 2013/0071085 A1 | 3/2013 | Ryman et al. |
| 2013/0097091 A1 | 4/2013 | Biswas et al. |
| 2013/0104190 A1 | 4/2013 | Simske et al. |
| 2013/0111260 A1 | 5/2013 | Reddy et al. |
| 2013/0132330 A1 | 5/2013 | Hurwitz et al. |
| 2013/0132963 A1 | 5/2013 | Lukyanov et al. |
| 2013/0133024 A1 | 5/2013 | MacLeod et al. |
| 2013/0167221 A1 | 6/2013 | Vukoszavlyev et al. |
| 2013/0212367 A1 | 8/2013 | Ingalls et al. |
| 2013/0227637 A1 | 8/2013 | Nagarajan et al. |
| 2013/0239166 A1 | 9/2013 | Macleod et al. |
| 2013/0276142 A1 | 10/2013 | Peddada |
| 2013/0311381 A1 | 11/2013 | Johnson |
| 2013/0340089 A1* | 12/2013 | Steinberg ............... H04L 63/10 726/27 |
| 2014/0006580 A1 | 1/2014 | Raghu |
| 2014/0007205 A1* | 1/2014 | Oikonomou ............ G06F 21/35 726/6 |
| 2014/0020072 A1 | 1/2014 | Thomas |
| 2014/0040999 A1 | 2/2014 | Zhang et al. |
| 2014/0075568 A1 | 3/2014 | Sathyadevan et al. |
| 2014/0089674 A1 | 3/2014 | Buehl |
| 2014/0165167 A1 | 6/2014 | Nunn et al. |
| 2014/0250165 A1 | 9/2014 | Duda |
| 2014/0269436 A1 | 9/2014 | Khanna et al. |
| 2014/0289796 A1 | 9/2014 | Moloian et al. |
| 2014/0380085 A1 | 12/2014 | Rash et al. |
| 2015/0026799 A1 | 1/2015 | Terao |
| 2015/0033297 A1 | 1/2015 | Sanso et al. |
| 2015/0033305 A1 | 1/2015 | Shear et al. |
| 2015/0059003 A1 | 2/2015 | Bouse |
| 2015/0082372 A1 | 3/2015 | Kottahachchi et al. |
| 2015/0134523 A1 | 5/2015 | Howe |
| 2015/0135305 A1 | 5/2015 | Cabrera et al. |
| 2015/0254726 A1* | 9/2015 | Cassidy ............... G06Q 30/0269 705/14.58 |
| 2015/0271200 A1 | 9/2015 | Brady et al. |
| 2016/0088021 A1* | 3/2016 | Jayanti Venkata .... H04W 16/06 726/1 |
| 2016/0277411 A1 | 9/2016 | Dani et al. |

(56) References Cited

U.S. PATENT DOCUMENTS

2016/0364576 A1 12/2016 Macleod et al.
2017/0302677 A1 10/2017 Dani et al.

FOREIGN PATENT DOCUMENTS

| CN | 102571703 A | 7/2012 |
|---|---|---|
| CN | 102571821 A | 7/2012 |
| CN | 102904892 A | 1/2013 |
| CN | 103312721 A | 9/2013 |
| CN | 103563294 A | 2/2014 |
| CN | 104104513 A | 10/2014 |
| CN | 104123616 A | 10/2014 |
| EP | 1650633 A1 | 4/2006 |
| JP | 2008090712 A | 4/2008 |
| WO | 2011162750 A1 | 12/2011 |
| WO | 2012107058 A1 | 8/2012 |

OTHER PUBLICATIONS

Shu et al., "Dynamic Authentication with Sensory Information for the Access Control Systems," IEEE Transactions on Parallel and Distributed Systems Year: 2014 | vol. 25, Issue: 2 | Journal Article.*
Sarrel, Matt, "Authentication Via Mobile Phone Enhances Login Security", Published on: Feb. 24, 2012 Available at: http://www.informationweek.com/applications/authentication-via-mobile-phone-enhances-login-security/d/d-id/1103017?.
Dietz, Michael Thomas, "Improving User Authentication on the Web: Protected Login, Strong Sessions, and Identity Federation", In Thesis of Doctor of Philosophy, Jan. 2014, 171 pages.
"Local and Remote Notification Programming Guide", Published on: Mar. 20, 2015 Available at: https://developer.apple.com/library/ios/documentation/NetworkingInternet/Conceptual/RemoteNotificationsPG/Chapters/WhatAreRemoteNotif.html.
"Alert User Session Expire", Published on: Aug. 14, 2012 Available at: https://code.msdn.microsoft.com/AspNetAlertSessionExpire-c230a148.
"Privileged Session Manager", Published on: Apr. 21, 2014 Available at: http://software.dell.com/products/privileged-session-manager/.
International Search Report and Written Opinion cited in PCT Application No. PCT/US2016/039923 dated Sep. 1, 2016, 11 pgs.
Second Written Opinion dated Feb. 9, 2017 cited in Application No. PCT/US2016/039923, 6 pgs.
"BMC Remedy Change Management 7.0 User's Guide", Retrieved From: https://communities.bmc.com/servlet/JiveServlet/download/558370-31538926/Change-User-Guide-700.pdf, Jun., 2006, 410 Pages.
"Change Management Process Version 1.0", Retrieved From: http://docplayer.net/5699641-Change-management-process.html, May 1, 2006, 14 Pages.
"Deployment Planning, Architecture, and Guidance on System Center Service Manager", Retrieved From: http://web.archive.org/web/20111115201923/http://technet.microsoft.com/en-us/library/gg281359.aspx, Oct., 2010, 4 Pages.
"IBM Tivoli Business Continuity Process Manager", Retrieved From: http://web.archive.org/web/20100829205413/http://www-01.ibm.com/software/tivoli/products/business-continuity-process-mgr/features.html, Retrieved Date: Oct. 4, 2011, 2 Pages.
"Lockbox: Technology Platform", Retrieved From: https://web.archive.org/web/20130818042122/http://www.lock-box.com/technology-platform/, Retrieved Date: Nov. 20, 2012, 3 Pages.
"Master Data Services Environment", Retrieved From: http://download.microsoft.com/download/5/9/F/59F1639E-EF57-4915-8848-EF1DC2157EBB/02%20MDS%20Environment.pdf, Retrieved Date: Oct. 4, 2011, 16 Pages.
"PCI DSS Compliance in the UNIX/LINUX Datacenter Environment", Retrieved From: http://i.zdnet.com/whitepapers/BeyondTrust_PCIDSSComplianceintheUNIXLinuxDatacenterEnvironment.pdf, Aug., 2009, 19 Pages.

"Stoneware: Single Sign-on", Retrieved From: http://web.archive.org/web/20130516130511/http://www.stone-ware.com/webnetwork/lenovo/sso, Retrieved Date: Nov. 21, 2012, 3 Pages.
"Final Office Action Issued in U.S. Appl. No. 13/413,078", dated Sep. 24, 2013, 37 Pages.
"Final Office Action Issued in U.S. Appl. No. 13/413,078", dated Aug. 8, 2014, 38 Pages.
"Non-Final Office Action Issued in U.S. Appl. No. 13/413,078", dated Apr. 19, 2013, 33 Pages.
"Non-Final Office Action Issued in U.S. Appl. No. 13/413,078", dated Dec. 31, 2014, 31 Pages.
"Non-Final Office Action Issued in U.S. Appl. No. 13/413,078", dated Jun. 18, 2015, 39 Pages.
"Non-Final Office Action Issued in U.S. Appl. No. 13/413,078", dated Feb. 24, 2014, 39 Pages.
"Final Office Action Issued in U.S. Appl. No. 13/413,078", dated Nov. 19, 2015, 43 Pages.
"Notice of Allowance Issued in U.S. Appl. No. 13/413,078", dated Mar. 17, 2016, 10 Pages.
Wright, Travis, "System Center Service Manager 2010 Release Candidate Released!!", Retrieved From: https://blogs.technet.microsost.com/servicemanager/201 0/03/03/system-center-service-manager-2010-release-candidate-released/, Mar. 3, 2010, 3 Pages.
Yu, et al., "Data Security in Cloud Computing", In Morgan Kaufmann/Elsevier, Book Section 15, Jan., 2012, 29 Pages.
"Non-Final Office Action Issued in U.S. Appl. No. 14/663,082", dated Sep. 8, 2016, 35 Pages.
"Advisory Action Issued in U.S. Appl. No. 15/247,105", dated Apr. 11, 2019, 8 Pages.
"Advisory Action Issued in U.S. Appl. No. 15/247,105", dated May 30, 2018, 8 Pages.
"Final Office Action Issued in U.S. Appl. No. 15/247,105", dated Jan. 24, 2019, 48 Pages.
"Final Office Action Issued in U.S. Appl. No. 15/247,105", dated Mar. 13, 2018, 49 PAges.
"Non-Final Office Action Issued in U.S. Appl. No. 15/247,105", dated May 29, 2019, 44 Pages.
"Non-Final Office Action Issued in U.S. Appl. No. 15/247,105", dated Aug. 30, 2017, 40 Pages.
"Non-Final Office Action Issued in U.S. Appl. No. 15/247,105", dated Jul. 13, 2018, 55 Pages.
"Final Office Action Issued in U.S. Appl. No. 15/637,242", dated Feb. 26, 2019, 19 Pages.
"Non-Final Office Action Issued in U.S. Appl. No. 15/637,242", dated Jul. 10, 2018, 27 Pages.
Antonelli, et al., "Access Control in a Workstation-Based Distributed Computing Environment", In Proceedings of IEEE Workshop on Experimental Distributed Systems, Oct. 11, 1990, pp. 13-19.
Batishchev, Alexander, "Getting Elevated Privileges on Demand Using C#", Retrieved From: https://www.codeproject.com/articles/105506/getting-elevated-privileges-on-demand-using-c, Sep. 9, 2010, 4 Pages.
Bonneau, et al., "The Quest to Replace Passwords: A Framework for Comparative Evaluation of Web Authentication Schemes", In Proceedings of the 2012 IEEE Symposium on Security and Privacy, May 20, 2012, 15 Pages.
Davis, David, "Using roles to Secure Your VMWare ESX Infrastructure", Retrieved From: https://web.archive.org/web/20140810161319/http://www.virtualizationadmin.com/articles-tutorials/vmware-esx-and-vsphere-articles/general/using-roles-ecure-vmware-esx-infrastructure.html, Jul. 14, 2009, 5 Pages.
Florencio, et al., "One-Time Password Access to Any Server without Changing the Server", In Proceedings of the 11th International Conference on Information Security, Sep. 15, 2008, 16 Pages.
Huang, et al., "Using One-Time Passwords to Prevent Password Phishing Attacks", In Journal of Network and Computer Applications, vol. 34, Issue 4, Jul. 1, 2011, 10 Pages.
Huhns, et al., "Service-Oriented Computing: Key Concepts and Principles", Published in IEEE Internet Computing, vol. 9, Issue 1, Jan., 2005, pp. 75-81.
Kadar, et al., "Automatic Classification of Change Requests for Improved IT Service Quality", In Proceedings of Annual SRII Global Conference, Mar. 29, 2011, pp. 430-439.

(56) References Cited

OTHER PUBLICATIONS

Kaufman, et al., "Windows Azure TM Security Overview", Retrieved from: https://web.archive.org/web/20100821094232/http://www.globalfoundationservices.com/security/documents/WindowsAzureSecurityOverview1_0Aug2010.pdf, Aug., 2010, 24 Pages.
"International Preliminary Report on Patentability Issued in PCT Application No. PCT/US2016/022999", dated Jun. 21, 2017, 8 Pages.
"International Search Report and Written Opinion Issued in PCT Application No. PCT/US2016/022999", dated May 30, 2016, 11 Pages.
"Second Written Opinion Issued in PCT Application No. PCT/US2016/022999", dated Mar. 1, 2017, 7 Pages.
Ryutov, et al., "Adaptive Trust Negotiation and Access Control", In Proceedings of the Tenth ACM Symposium on Access Control Models and Technologies, Jun. 1, 2005, pp. 139-146.
Schlesinger, et al., "A Modeling Framework for Operating System Courses", In Journal of Computing Sciences in colleges, vol. 22, Issue 2, 2006, pp. 235-243.
Shwartz, Ifat, "Let's Get Rolling -The New Roles and Authorizations in SAP HANA Cloud Portal", Retrieved from: https://web.archive.org/web/20141120101421/http://scn.sap.com/community/hana-cloud-portal/blog/2014/06/18/the-riew-roles-and-authorizations-in-sap-hana-cloud-portal, Jun. 18, 2014, 3 Pages.
Silva, et al., "Self-Adaptive Role-Based Access Control for Business Processes", In Proceedings of IEEE/ACM 12th International Symposium on Software Engineering for Adaptive and Self-Managing Systems, May 20, 2017, pp. 193-203.
Wright, Travis, "Automating It: SCSM, SCCM, SCOM, SCVMM, Opalis- Better Together", Retrieved from: http://blogs.technet.com/b/servicemanager/archive/2010/08/25/automating-it-scsm-sccm-scom-scvmm-opalis-better-together.aspx, Aug. 25, 2010, 1 Pages.
Stanger, Mark, "Change Management Workflow Approval Scripts in Service-now.com", Retrieved from: https://web.archive.org/web/20111027173710/http://www.servicenowguru.com/scripting/change-management-workflow-approval-scripts-servicenowcom/, Oct. 20, 2010, 5 Pages.
"Non Final Office Action Issued in U.S. Appl. No. 15/637,242", dated Oct. 17, 2019, 19 Pages.
"First Office Action and Search Report Issued in Chinese Patent Application No. 201680016671.4", dated Oct. 24, 2019, 15 Pages.
"Office Action Issued in Argentina Patent Application No. 20160100589", dated Oct. 1, 2019, 1 Pages.
"Final Office Action Issued in U.S. Appl. No. 15/247,105", dated Nov. 13, 2019, 46 Pages.
"Non Final Office Action Issued in U.S. Appl. No. 15/637,242", dated Sep. 4, 2020, 28 Pages.
"Final Office Action Issued in U.S. Appl. No. 15/637,242", dated Apr. 30, 2020, 21 Pages.

\* cited by examiner

Mobile Computing Device

PRIVILEGED IDENTITY MANAGEMENT

BACKGROUND

User accounts have variable levels of authorization to computer systems and software applications. These computer systems and software applications typically limit the authorization for the user account to times when the user needs to use the privileged features.

Generally, this process is performed as a self-service that requires a user to enter login credentials or other information to obtain authorization. For example, the user may go through several workflows entering various pin numbers to be authenticated. Once the user obtains the authorization, the computer systems and software applications may limit the authorization to a specified time frame. At the end of the time frame, the user would then have to extend the authorization. The process of extending the authorization may also be performed as a self-service to receive approval of the extension.

In one example, the user may be actively using a website and utilizing one or more privileges on a website to perform various actions. During the user's interactive session, the website may determine that the user's privileges are nearing expiration. When the expiration is within a prescribed timeframe and the user has performed an action, the website may delay performing the action and redirect the user to perform multifactor authentication before continuing with the action. This multifactor authentication may show a message that the user's session is about to end and provide a workflow to extend the privilege.

For example, the user may be accessing a banking website that has a time out feature. At the end of time out, the banking website may prompt the user to continue the session. If the user selects to extend the session, the website will allow the user to continue using the features. However, if the user does not select to extend the session, the website will time out and not allow the user to continue to use the features.

Unfortunately, the user may be not be paying attention or may be unaware that the session is about to end. For example, the user may be conversing with a colleague, not looking at the screen, or the software application may be minimized. In such situations, browser pop-ups may be missed, the user may not notice an email with approval information (e.g., a link), and application notifications may be missed or not explicitly read. Further, many of these notifications may not be actionable to perform the authorization or session extensions because they may pose a security risk.

As a result, the session may time out. This may result in information in the session being lost and the user may have to restart the tasks. The user must then re-authenticate the authorization, which may require additional levels of approval, and the user may be unable to continue the session until the authorization is approved.

BRIEF SUMMARY

This summary is provided to introduce a selection of concepts in a simplified form that are further described below in the Detailed Description section. This summary is not intended to identify all key or essential features of the claimed subject matter, nor is it intended to be used as an aid in determining the scope of the claimed subject matter.

Aspects of a privileged identity management system and method provide users with the ability to request elevated privileges to perform tasks on computing systems and software applications. The user may communicate the request for elevated privileges to a privileged identity management system. The privileged identity management system may then approve or deny the request for elevated privileges. If the privileged identity management system approves or denies the request for elevated privileges, then the privileged identity management system communicates the decision to the computing system.

Another aspect of the privileged identity management system and method provides users with the ability to extend the elevated privileges to access privileged features or perform tasks using elevated privileges. Once the elevated privileges are nearing expiration, the user is prompted via another device to extend the session in order to maintain the elevated privileges. This other device is typically turned on and available to the user most of the time. As such, the user may be more responsive to receiving communications and notifications sent to the other device. The user may then extend the elevated privileges or may let the elevated privileges expire.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Figure 1:
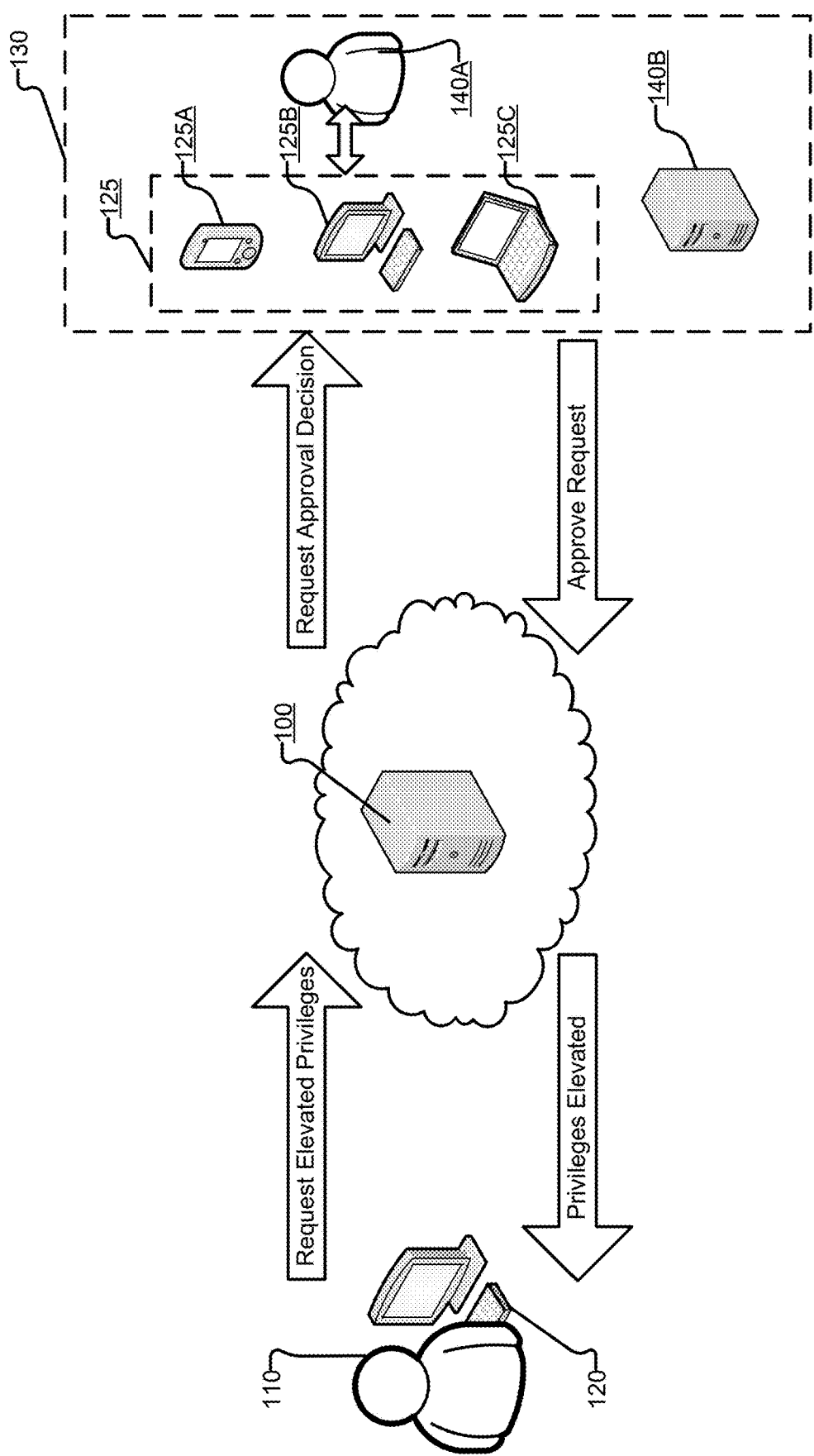
FIG. 1 illustrates a functional block diagram of an example of a privileged identity management system.

FIG. 1 illustrates a functional block diagram of an example of a privileged identity management system 100. In the illustrated embodiment, a user 110 is utilizing a software application on a computing device 120 to perform tasks. According to examples, the computing device 120 may be one of various types of computing devices (e.g., a mobile communication device, an entertainment appliance, a wearable device, a tablet device, a personal computer, a gaming console, or other type of computing device) for executing the software application.

The user 110 may need additional privileges to perform a task on the software application. In response, the computing device 120 communicates a request to the privileged identity management system 100 for elevated privileges. This request may include additional information relating to the elevated privileges. The software application may be part of a system that includes the privileged identity management system 100. In an alternate example, the software application may rely on a third-party to provide the privileged identity management system 100.

The privileged identity management system 100 then communicates the request for elevated privileges to a computing device 125 associated with a privileges manager 130. The computing device may include a mobile computing device 125A, a desktop computing device 125B, laptop or tablet device 125C, or any other computing device (e.g., a smartphone, a smartphone-tablet hybrid device, an entertainment appliance, a wearable device, a tablet device, a personal computer, a gaming console, a large screen device, etc.) suitable for communicating with the privileged identity management system 100. The privileges manager 130, e.g., a human operator 140A or an automated system 140B, is presented with the request for elevated privileges.

The privileges manager 130 may then approve or deny the request for elevated privileges. The approval may require a personal identification ("PIN") code and may also specify other privilege information. For example, the privilege information may include parameters such as a time limit on the user's access to the elevated privileges. The privileges manager 130 may also utilize an audio and motion sensing device (e.g., Kinect® by MICROSOFT CORPORATION of Redmond Wash.) to receive audio and gesture inputs, electrical activity detectors to receive brain activity inputs, and other types of input devices.

If the privileges manager 130 approves or denies the request for elevated privileges, then the manager 125 communicates the decision to the privileged identity management system 100. If the privileges manager 130 approves the elevated privileges, the privileged identity management system 100 communicates the elevated privileges to the user 110.

Figure 2:
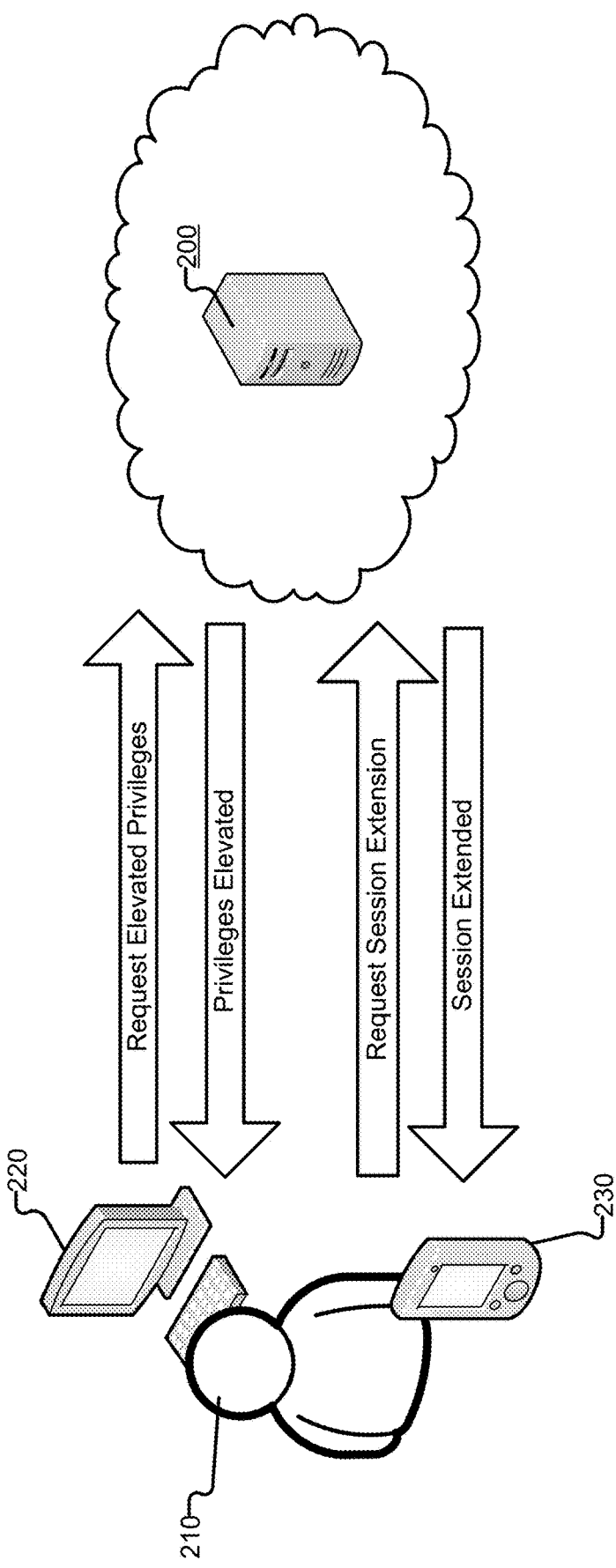
FIG. 2 illustrates a functional block diagram of an example of a privileged identity management system.

FIG. 2 illustrates a functional block diagram of an example of a privileged identity management system 200. In the illustrated example, the user 210 wants to access privileged features or perform tasks using elevated privileges, which would require a privileged identity. Accordingly, the user 210 requests that the privileged identity management system 200 elevate the user's privileges. In one example, the user 210 may request the elevated privileges via a software application running on a first computing device 220. The privileged identity management system 200 may require a multifactor authentication, a manager approval or another form of security authentication. In one example, the user may interact with the privileged identity management system 200 as described in FIG. 1, including having a privileges manager 130 approve the elevated privileges. Once the elevated privileges are approved, the privileged identity management system 200 communicates the elevated privileges to the user 210 and the user 210 is able to continue work using the elevated privileges.

However, after the user 210 is approved for the elevated privileges, the privileged identity management system 200 monitors aspects of the elevated privileges. For example, the privileged identity management system 200 may initiate a countdown with respect to the time limit designated in the parameters. Once the time limit is nearing expiration, the user 210 is required to extend the session in order to maintain the elevated privileges. As such, before the time limit has expired, the privileged identity management system 200 determines that the session associated with the elevated privileges will be expiring soon. Thereafter, the privileged identity management system 200 communicates the impending expiration of the elevated privileges to the user 210. It should be noted that a user 210 may be distracted, may ignore a message, or may not be present at the first computing device 220. Further, a user 210 may be less responsive to a communication on the first computing device 220 because the user 210 frequently gets various notifications on the first computing device 220.

Accordingly, the privileged identity management system 200 may initiate the communication to the user 210 via another device. In the illustrated example, the other device receiving the communication is a mobile device 230. It should be appreciated that a mobile device 230, tablet device, or a personal device is typically turned on and available to the user 210 most of the time. Further, most people notice and are responsive to their mobile devices 230 ringing or receiving a message notification (e.g., vibrating, buzzing, flashing). For at least that reason, communication via the mobile device 230 will alert the user 210 regardless of whether the user 210 is sitting in front of the display of the first computing device 220 or if the user 210 is away from the first computing device 220. In one example, the communication via the mobile device 230 will allow the user 210 to interact with the privileged identity management system 200 and input whether to extend or expire the session.

In the illustrated example, the privileged identity management system 200 communicates with the user's mobile device 230. This communication may be in the form of a telephone call indicating that the elevated privileges will be expiring soon and presents options to the user 210. The user 210 may then extend the elevated privileges or may let the elevated privileges expire. In one example, the user 210 may provide a verbal response or a PIN code to extend the session. The user 210 may also request that the elevated privileges be extended for a certain amount of time. It should be appreciated that the process for extending the elevated privileges may be less burdensome than initially requesting the elevated privileges.

It should also be noted that certain users 210 may utilize a handheld device or mobile device 230 for the work session. In such situations, the privileged identity management system 200 may communicate to the user 210 via the same handheld device or mobile device 230 that is being utilized.

Figure 3:
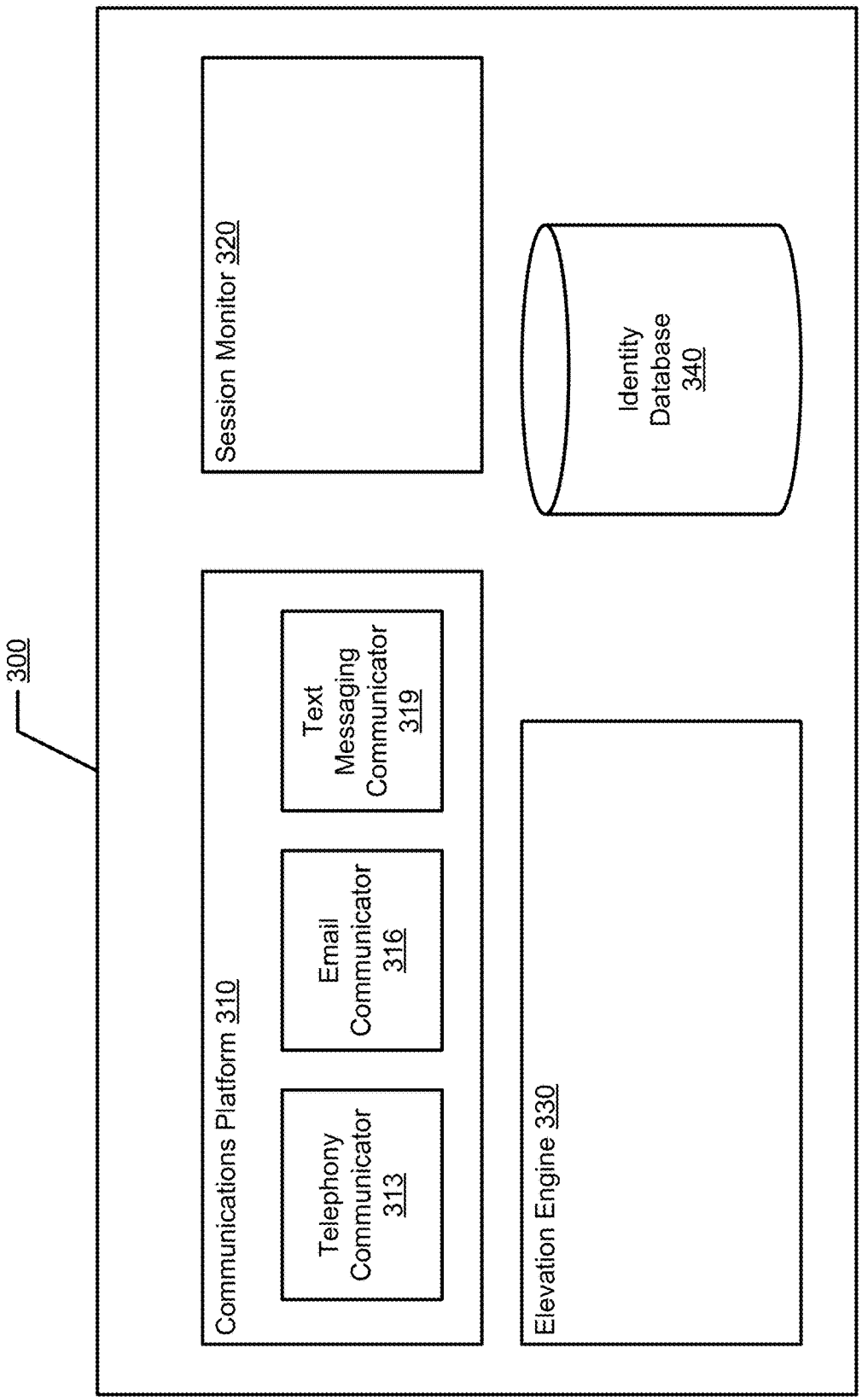
FIG. 3 is a block diagram of an example privileged identity management system.

FIG. 3 is a block diagram of an example privileged identity management system 300. The illustrated example privileged identity management system 300 includes a communications platform 310, a session monitor 320, an elevation engine 330, and an identity database 340. In one example, the communications platform 310, the session monitor 320, the elevation engine 330, and the identity database 340 are located on a single computing device. In another example, the components of the privileged identity management system 300 are distributed across a network on multiple computing devices or data stores. For example, the communications platform 310 may be separate from a server having the session monitor, the elevation engine and databases, such that the server instructs the communications platform 310 on the different system to make a telephone call or send a text message.

The communications platform 310 provides communication between the privileged identity management system 300, the user 110, and the privileges manager 130 when needed. The communications platform 310 is in communication with the user 110 to receive requests for elevated privileges and other parameters relating to the elevated privileges. The communications platform 310 is configured to receive requests for elevated privileges from the user 110. In one example, the communications platform 310 requires additional information and parameters relating to the requests for elevated privileges. For example, the additional information may include parameters that specify contact information for the user 110, a user-defined session length for the elevated privileges, and/or information specifying the location of the user 110. These parameters may specify how the privileged identity management system communicates 300 the elevated privileges or privilege expiration. It should be noted that the communications platform 310 may also include functionality to allow the user 110 to interact with the privileged identity management system 300 via voice commands.

Generally, the communications platform 310 enables several types of communication that would be desirable to contact the user 110 or the privileges manager 130. In the illustrated example, the privileged identity management system 300 includes, as components of the communications platform 310, a telephony communicator 313 to send a communication via a phone call, a text messaging communicator 319 to send a communication via text messages, and an electronic mail communicator 316 to send a communication via email. Each of the telephony communicator 313, messaging communicator 319, and electronic mail communicator 316 include transceivers to receive and transmit communications according to their given formats, registers to hold the communications for processing between human-readable and machine-readable formats, to perform error correction methods (e.g., buffering, convolutional coding, checksums, hash values) and to encrypt or decrypt the communications, and may include computer readable storage media devices to store or archive the communications for later provision. For example, the telephony communicator 313 includes components operable to enable voice communications to be transmitted and received over wired and wireless transmission media according to cellular communication standards (2G, 3GPP, 4G, WiMAX, HiperMAN, iBurst) wired telephone standards (e.g., Plain Old Telephone Service (POTS), Integrated Services of Digital Network (ISDN)), and Voice over Internet Protocol (VoIP) standards (e.g., the Skype® protocol made available by MICROSOFT CORPORATION of Redmond Wash., Real-time Transport Protocol (RTP), H.248) via a Public Switched Telephone Network (PSTN), cellular network, or the internet. The text messaging communicator 319 includes components operable to enable text and image communications to be transmitted and received over wired and wireless transmission media according to the Short Message Service (SMS) and/or the Multimedia Messaging Service (MMS). The electronic mail communicator 316 includes components operable to enable email communications to be transmitted and received over wired and wireless transmission media according to the Internet Message Access Protocol (IMAP), the Post Office Protocol (POP), the Simple Mail Transfer Protocol (SMTP) and/or webmail via the Transmission Control Protocol and the Internet Protocol (TCP/IP) or the File Transfer Protocol (FTP). Other communication types may be utilized to communicate with the user 110 or privileges manager 130.

Further, it should be noted that the communications platform 310 includes a voice interaction processor (not illustrated) for receiving voice communications from the user 110 or privileges manager 130. This allows the user 110 to provide natural language responses that are converted to text via voice recognition software. With respect to text messages, the privileged identity management system 300 may communicate with the user 110 via text messages that are sent as push notifications. Accordingly, the user's computing device 120 may include an application to receive and display the push notification.

The identity database 340 is provided by one or more data stores that may be located throughout a network. Further, the data stores include different types of information. In one example, a first identity database 340 may include information relating to which users can request elevated privileges. In another example, a second identity database 340 may include parameters that specify how the privileged identity management system 300 corresponds with the user. For example, the parameters may include devices associated with the user, phone numbers to contact the user 110, phone numbers to send text messages, or other types of contact information. In one example, the parameters may include information specifying a user-defined session length for the elevated privileges. In another example, the parameters may include information specifying the location of the user 110. The identity database 340 may also include a list of the next privileges manager 130 for situations when the first manager does not respond within a certain amount of time or if the privileges manager 130 needs to be notified at the same time as the user 110. Further, the list of privileges managers 130 may be based on the user 110 or a user group.

The session monitor 320 provides functionality to monitor aspects of the sessions. In one example, once an elevated privilege session begins, the session monitor 320 may track the session based on the parameters supplied by the user 110 at the start of the session, the time period of the elevated privileges, and/or the authorization level of the elevated privileges. At a certain point in time, the session monitor 320 may determine that the elevated privileges are about to lapse. For example, the session monitor 320 may determine that the elevated privilege is allowed for 30 minutes and begins tracking the usage time. When the usage time reaches a certain point, e.g., five minutes, before the end of the allocated time, the session monitor 320 may communicate the impending expiration of the elevated privileges to the elevation engine 330.

The elevation engine 330 includes functionality allowing the user's privileges to be elevated and/or extended. In one example, the elevation engine 330 is an application that includes a user interface to display aspects relating to the elevation of privileges or the extension of privileges. In one example, the elevation engine 330 communicates with the session monitor 320 and the identity database 340 to determine the information that is conveyed to the user 110 or the privileges manager 130.

The elevation engine 330 accesses the identity database 340 to retrieve the parameters received from the user 110 at the start of the session or information received from the user 110 at the time of the extension. The privileged identity management system 300 utilizes the parameters to determine how to communicate with the user 110. For example, the elevation engine 330 may parse the identity database 340 to determine the parameters of communication, such that the elevation engine 330 can communicate via the appropriate type of communication. In one example, the elevation engine 330 may retrieve information that the user 110 should be contacted via a telephone call. In another example, the elevation engine 330 may retrieve information that the user 110 should be contacted via a text message. In one example, the elevation engine 330 may determine that the manager 140A should be notified of the user's location because of security risks. Further, in situations where the parameters do not allow for additional elevation or extensions, the elevation engine 330 may simply notify the user 110 that the elevated privileges will terminate.

Figure 4:
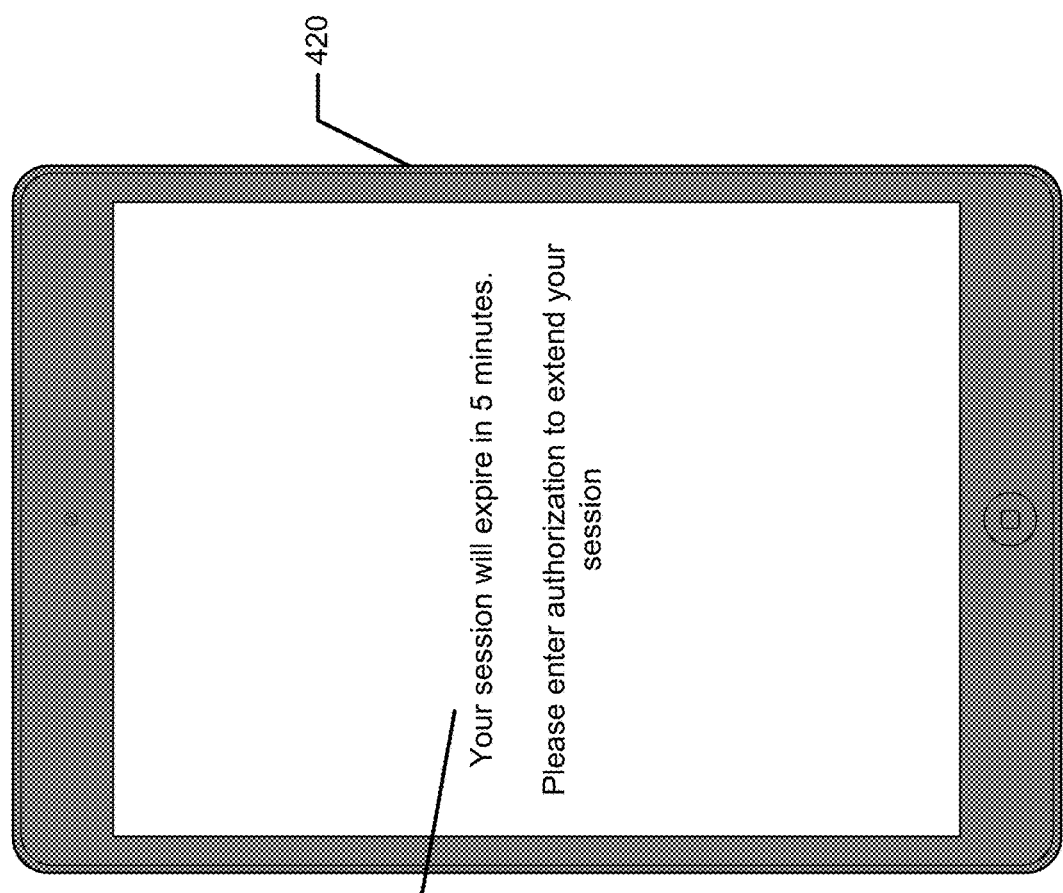
FIG. 4 is an example illustration of a notification on a mobile device or tablet device.

FIG. 4 is an example illustration 400 of a notification 410 on a mobile device or tablet device 420. In the illustrated example, the mobile device or tablet device 420 is displaying a notification 410 that the elevated privileges are about to expire. Further, the notification 410 provides instructions for the user 110 to extend the elevated privileges, if desired. It should also be appreciated that the notification 410 may be provided via another type of communication supported by the communication platform 310.

Figure 5:
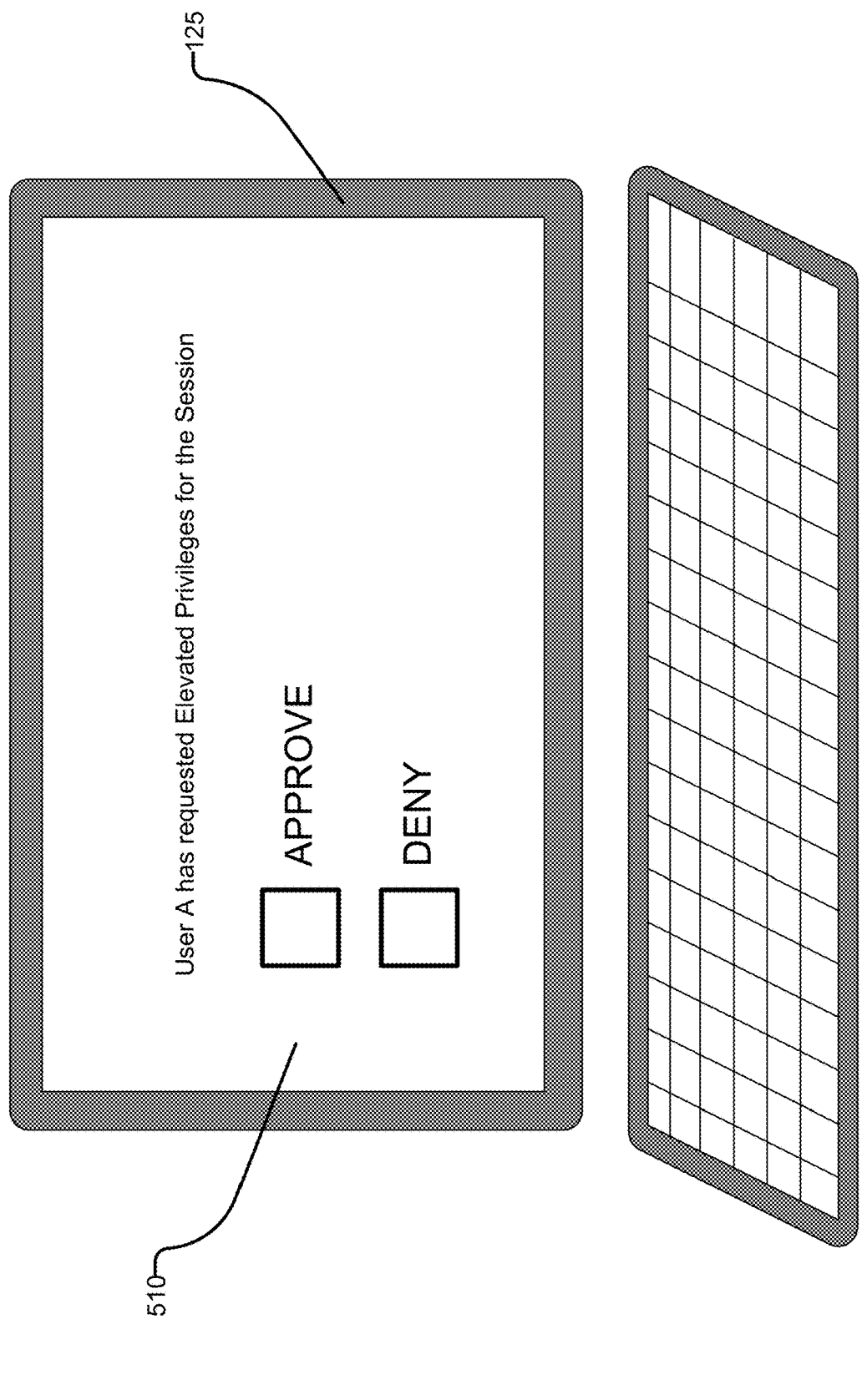
FIG. 5 is an example illustration of a notification that a user has requested elevated privileges for a session.

FIG. 5 is an example illustration 500 of a notification 510 on a computing device 125 that a user 110 has requested elevated privileges for a session. The computing device 125 may include a mobile computing device 125A, a desktop computing device 125B, laptop or tablet device 125C, or any other computing device suitable for communicating with the privileged identity management system 100. The privileges manager 130 may then approve or deny the request for elevated privileges via the computing device 125. The notification may also include parameters relating to the elevated privileges or information relating to the user 110. In the illustrated example, the privileges manager 130, e.g., a human operator 140A, is presented with the notification 510 requesting elevated privileges.

Figure 6:
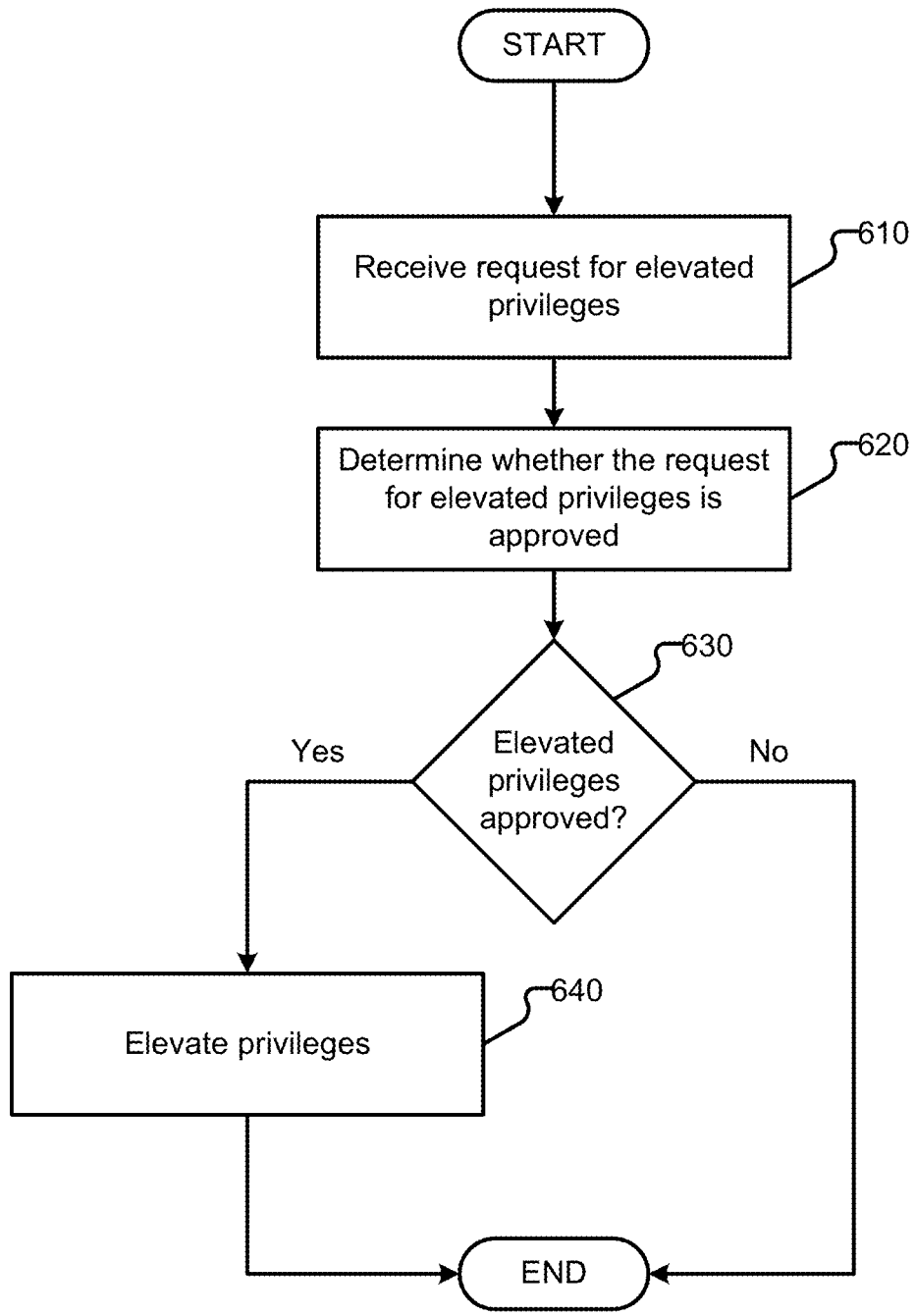
FIG. 6 illustrates a flow chart showing general stages involved in an example method for providing privilege elevation in the privileged identity management system.

FIG. 6 illustrates a flow chart showing general stages involved in an example method 600 for providing privilege elevation in the privileged identity management system 100. The method starts at OPERATION 610, where a user 110 may be accessing computing systems and/or software applications with variable levels of privileges for performing tasks.

In one example, the user 110 is utilizing an application that interacts with the privileged identity management system 100 to provide elevation of the user's privileges. In one example, the application is part of a privileged identity management system 100. However, in another example, the application is separate from the privileged identity management system 100 and utilizes a privileged identity management system 100 provided by another system (e.g., the privileged identity management system 100 may be provided by a third-party via a sever, cloud-based network, virtual machine, etc.).

At OPERATION 610, the user 110 requests elevation of privileges to access functionality associated with the computing system and/or software application. The request for elevation of privileges includes a request for a single elevated privilege or a request for multiple elevated privileges. The application may provide functionality and options for the user 110 to interact with the privileged identity management system 100 to communicate various information. For example, the application may allow the user 110 to set parameters indicating a session duration that the privileges are needed, information regarding privileged identity management system 100 provides alerts to the user 110 or a privileges manager 130, one or more alternate devices for the privileged identity management system 100 to communicate with the user 110 (e.g. mobile device 230), textual information regarding the user's need for the elevated privileges, other databases that may provide contact information, other information relating to the request for elevated privileges, and/or other methods to communicate with the user 110. The application may also provide geo-location information relating to the location of the user's computing device 120, mobile device 230 or alternate device to be used for communication with the user.

At OPERATION 620, the privileged identity management system 100 determines whether to approve or deny the request for elevated privileges. In one example, the privileged identity management system 100 receives a determination from a privileges manager 130 whether to approve or deny the request for elevated privileges. In one example, the privileges manager 130 may approve or deny the entire request for elevated privileges. In another example, when the request for elevated privileges includes requests for multiple privileges, the privileges manager 130 may approve a portion of the multiple privileges, deny a portion of the multiple privileges, and/or hold a portion of the multiple privileges.

In another aspect of the privileged identity management system 100, requests for elevated privileges may require approvals from multiple privileges managers 130. For example, the privileged identity management system 100 may include a hierarchy of privileges that may have varying amounts of privileges. Thus, one level of privilege may only require a single approval and a second level of privilege may require two approvals and location verification.

Further, these elevated privileges typically include a time limit on the user's access to the elevated privileges. For example, when the elevated privileges are provided on a just-in-time manner, the elevated privileges may have predetermined time period (e.g., of one hour). In another example, the time period for the elevated privileges may be determined by the privileges manager 130. In another example, the privileged identity management system 100 may designate time when the user 110 is preapproved for elevated privileges. For example, the privileged identity management system 100 may provide elevated privileges from 9:00 AM to 5:00 PM, which would cause the elevated privileges to expire at 5:00 PM.

In one example, the approval determination may designate the user 110, a group of users, or all of the users. The approval determination may also be based on conditions like time of day, location, suspicious behavior, or other parameters associated with the request for elevated privileges. For example, when the request for elevated privileges occurs during off hours and the user 110 is in a suspicious location, the privileged identity management system 100 may require additional information or workflows for approval of the elevated privileges. Further, the privileged identity management system 100 may use geo-location information or other parameters to change the workflow such that someone else (e.g., a human operator 140A) may need to be contacted to approve the request. In one example, the privileged identity management system may contact a third party to determine whether to approve the request. It should also be noted, that geo-location and other parameters associated with the third party may also be considered when requesting approval from the third party.

In should also be noted that the privileges manager 130 may need additional information to make the determination whether to approve or deny the request for elevated privileges. For example, the request for elevated privileges may include additional information that the privileges manager 130 may find to be suspicious, such as a location or behavior. When additional information is needed, the privileges manager 130 may request or initiate a communication (e.g., a voice connection via a cellular device, telephone, VOIP, etc.) to the user to discuss the request for elevated privileges.

At OPERATION 630, the privileged identity management system determines whether request for elevated privileges has been approved. When the privileged identity management system 100 determines that the request for elevated privileges has been approved, the method proceeds to OPERATION 640, where the elevated privileges are provisioned to the user 110 in accordance with the time frame set by the approval. Alternatively, when the privileged identity management system 100 determines that the request for elevated privileges has been denied, the user 110 may continue their work session without the elevated privileges.

Figure 7:
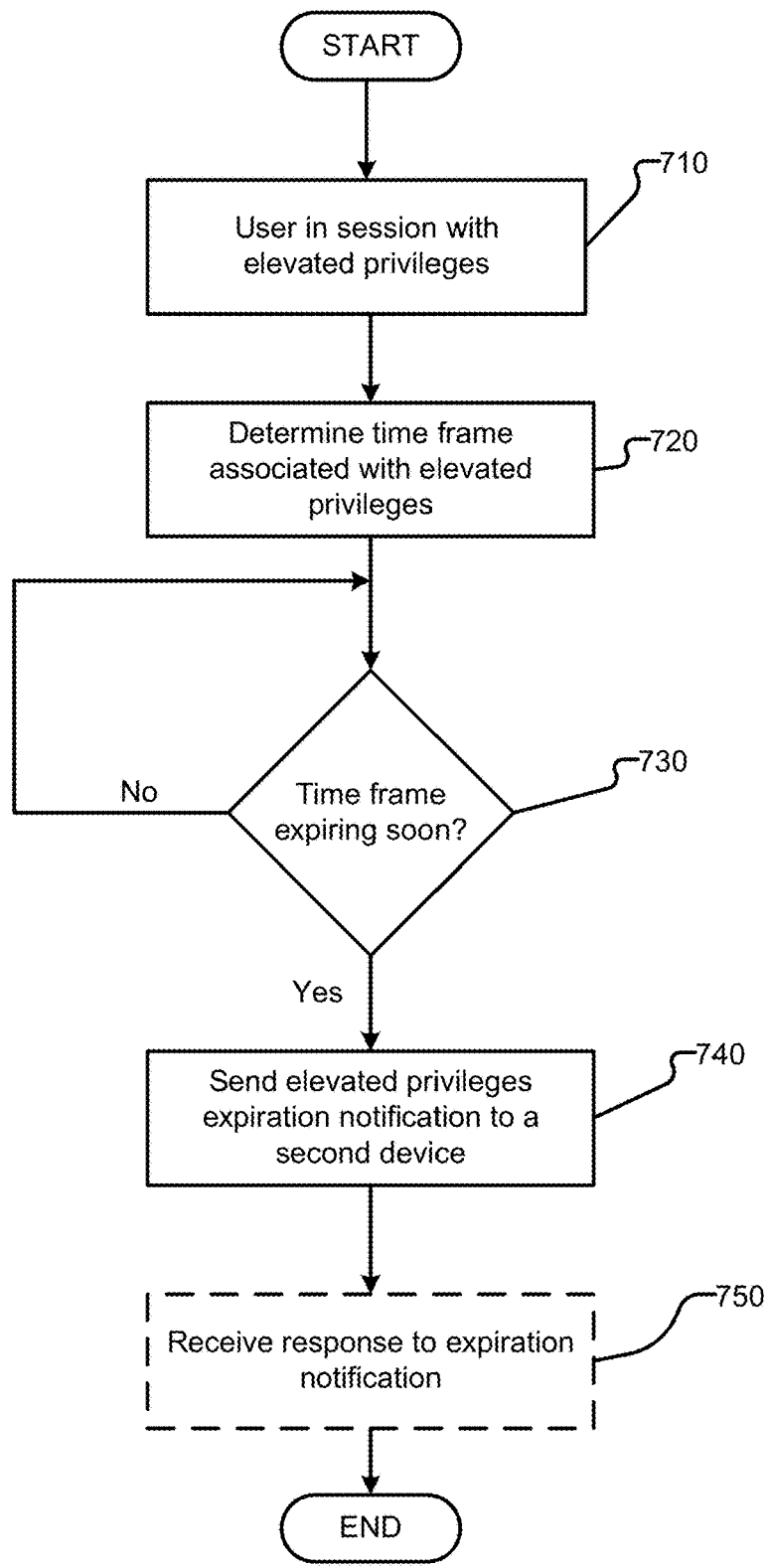
FIG. 7 illustrates a flow chart showing general stages involved in an example method for providing privilege extension in the privileged identity management system.

FIG. 7 illustrates a flow chart showing general stages involved in an example method 700 for providing privilege extension in the privileged identity management system.

At OPERATION 710, the user 110 is in a session on a computing system and/or software application with elevated privileges to perform tasks. It should be appreciated that elevated privileges may be provisioned in accordance with the method 600 described above with reference to FIG. 6.

At OPERATION 720, the privileged identity management system 100 determines a triggering event associated with the elevated privileges. Once an elevated privilege session begins, the privileged identity management system 100 may track the session based on the parameters supplied by the user 110 at the start of the session and the specified time period of the elevated privileges. For example, the privileged identity management system 100 may determine that the elevated privilege is allowed for one hour before the elevated privilege must be extended or re-authenticated. The privileged identity management system 100 may also require re-authentication based on a suspicious activity or a suspicious location of the user. For example, the privileges manager 140 may observe that the user has requested an extension within five minutes of receiving an initial approval for an elevated privilege. In another example, the privileges manager 140 may observe usages of the elevated privilege in a first location and changes in the location of another device that is used to extend or re-authenticate the elevated privilege. Accordingly, the privileged identity management system 100 may be prompted to re-authenticate the user's elevated privilege.

At OPERATION 730, the privileged identity management system 100 determines that the elevated privileges will be expiring soon. In one example, the privileged identity management system 100 may determine that the elevated privileges will expire in five minutes.

When the elevated privileges reach a certain point, the method advances to OPERATION 740. At that time, the privileged identity management system 100 sends an elevated privilege expiration notification to the user 110 via a second device 230. In one example, the elevated privilege expiration notification may be sent to multiple devices (e.g., a pager and a mobile telephone) or persons regardless of whether the person is actively engaged in the session with elevated privileges.

The elevated privilege expiration notification may be communicated to the user's second device 230 in the form of a telephone call, text message, or other form of communication. The user 110 may then choose to extend the elevated privileges by providing a form of authentication.

In one example, the elevated privileges may be designated to end at 5:00 PM; the end of the work day. Accordingly, the privileged identity management system 100 may send the elevated privilege expiration notification 410 to the user 110 to alert the user 110 to extend the elevated privileges if desired. The privileged identity management system 100 evaluates various parameters associated with the user 110 and the elevated privileges and communicates the authorization to the user 110 via an authorized device.

In another example, the user 110 may have requested elevated privileges for a computing device within a conference room. Accordingly, the user 110 may specify in the parameters that the elevated privileges are requested for the duration of the meeting. However, the elevated privileges are chosen to expire at a time corresponding to the end of the meeting. In such a situation, the elevated privilege expiration notification 410 merely indicates that the elevated privileges will expire within a specified time period. Accordingly, the user 110 may leave the conference room at the end of the meeting with knowledge that the elevated privileges will not be a potential security risk.

At OPERATION 750, the privileged identity management system 100 may optionally receive a response to the expiration notification 410 from the user 110. For example, the user 110 may have chosen to extend the elevated privileges. In one example, the user 110 may provide a verbal response, a PIN code, a voice print, a fingerprint scan, a retinal scan, or a face scan via the second device 230.

Figure 8:
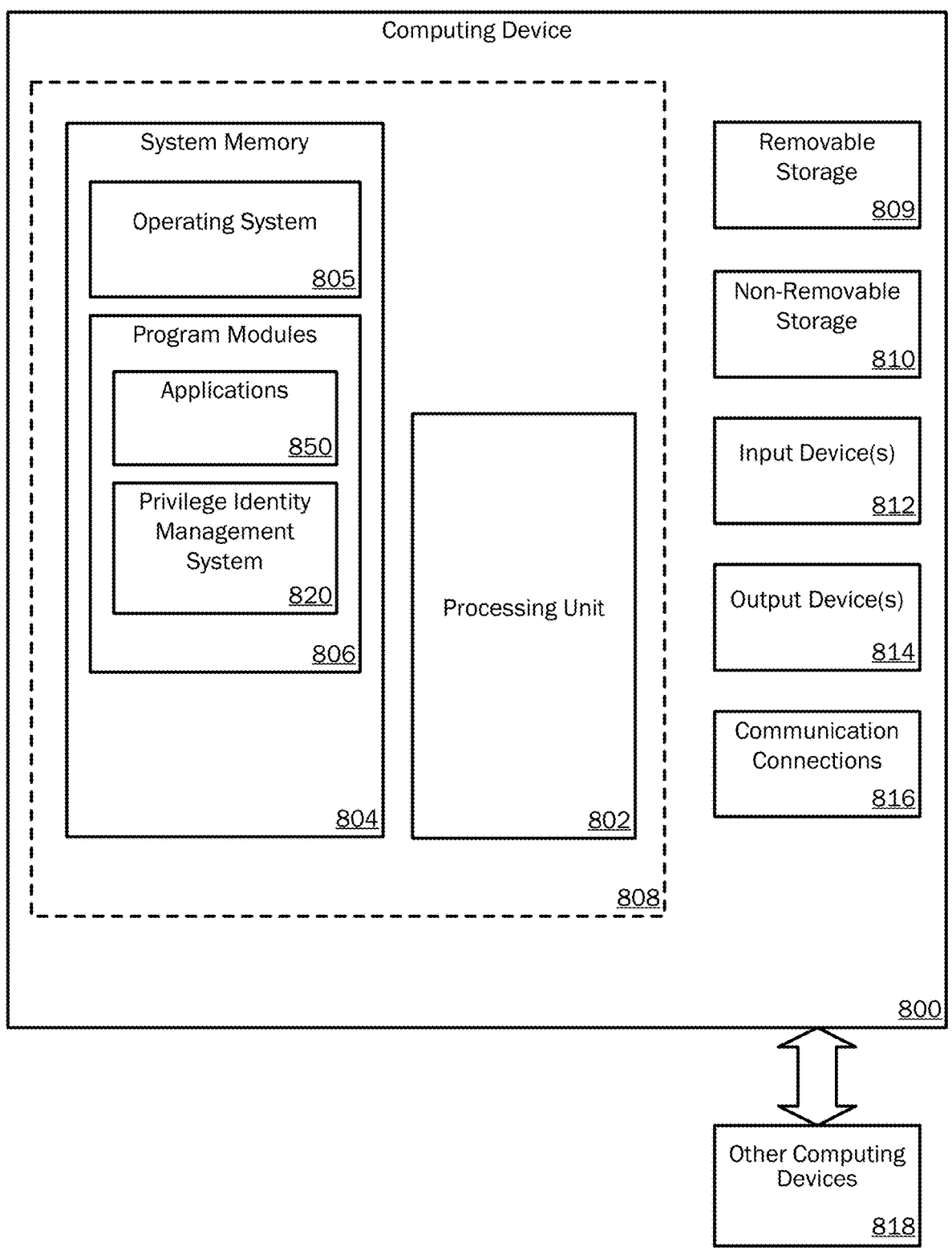
FIG. 8 is a block diagram illustrating one example of the physical components of a computing device.

FIG. 8 is a block diagram illustrating physical components (i.e., hardware) of a computing device 800 with which examples of the present disclosure are be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more programming modules 806 suitable for running software applications 850. According to an aspect, the system memory 804 includes the privileged identity management system 820. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape.

Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., privileged identity management system 820) performs processes including, but not limited to, one or more of the stages of the methods 600, 700 illustrated in FIGS. 6 & 7. According to an aspect, other program modules are used in accordance with examples and include applications such as electronic mail and contacts applications, word processing applications, spreadsheet applications, database applications, slide presentation applications, drawing or computer-aided application programs, etc.

According to examples, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 9A:
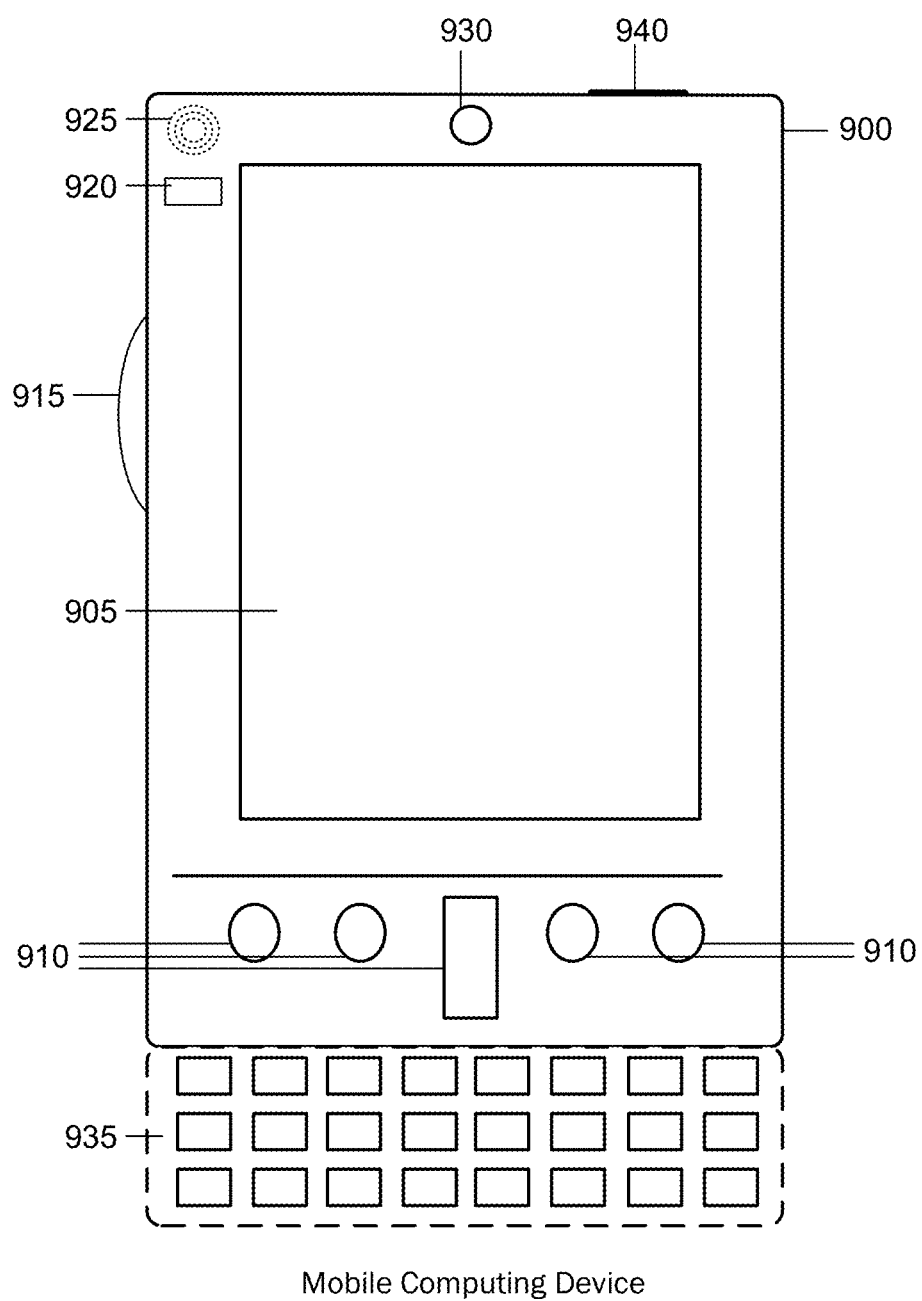
FIGS. 9A and 9B are simplified block diagrams of a mobile computing device.
Figure 9B:
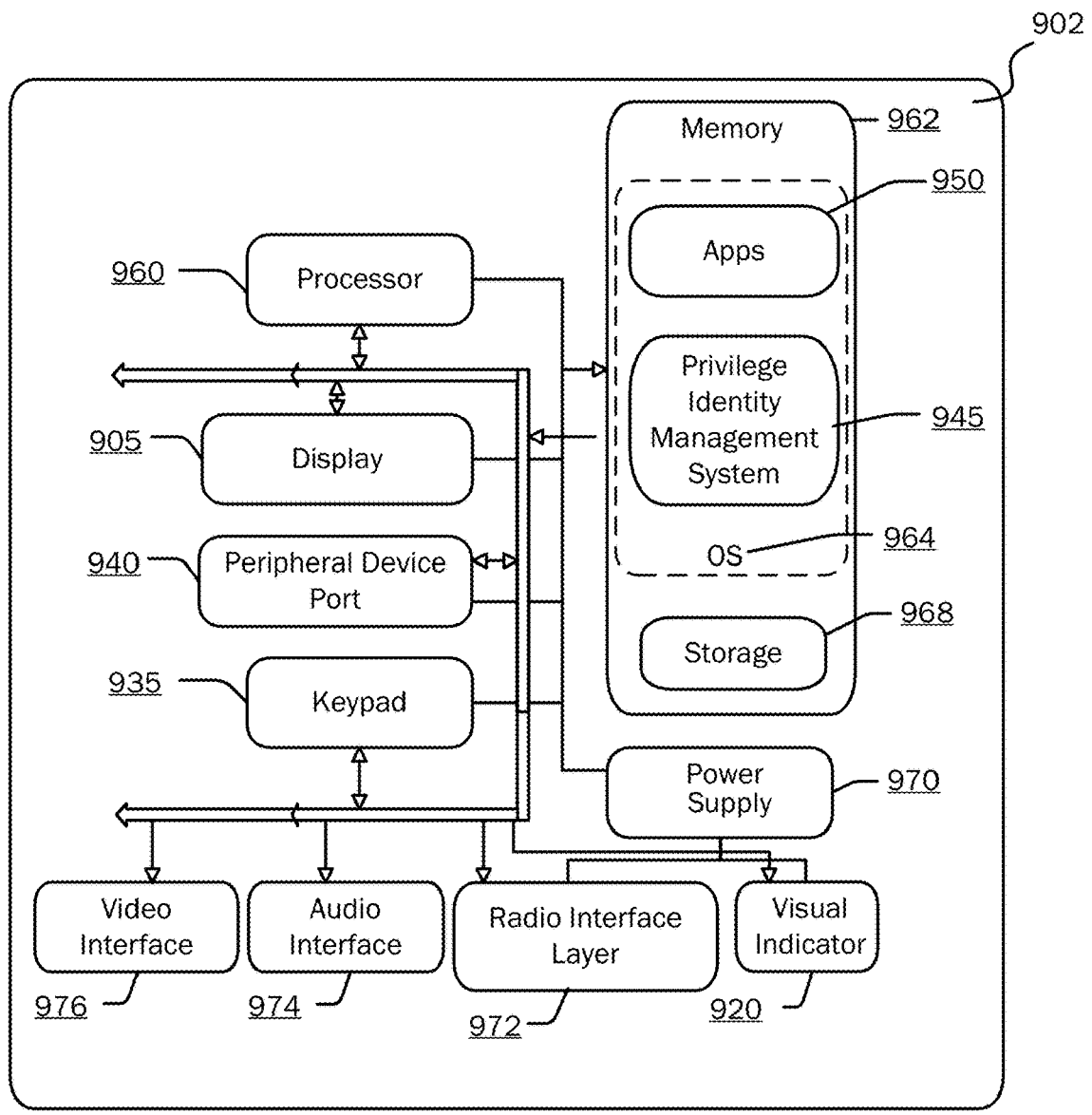

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the privileged identity management system 945 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

Aspects, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Examples should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method for providing privileges and extensions of elevated privileges, the method comprising:
    receiving, from a first computing device associated with a first user, a request to elevate a privilege associated with the first user, wherein the request includes contact information of a second computing device associated with a second user for receiving communications regarding the privilege;
    sending a request for approval to the second computing device;
    receiving, from the second computing device, a first approval of the request, the first approval including an authentication identifier associated with the second user to authenticate the second user;
    based on the first approval and an authentication of the second user, provisioning the privilege to the first user;

identifying a time period associated with an expiration of the privilege;

determining, based on the time period, whether the privilege is expiring within a period of time; and in response to determining that the privilege is expiring within the period of time:

sending a notification to the second computing device indicating the impending expiration of the privilege;

receiving, from the second computing device, a second approval to extend the time period associated with the privilege, the second approval comprising the authentication identifier associated with the second user; and based on the second approval and an authentication of the second user, extending the time period associated with the privilege.

2. The method of claim 1, further comprising prior to receiving the second approval, receiving a request from the first computing device to extend the time period associated with the privilege.

3. The method of claim 2, wherein the authentication identifier associated with the second user comprises at least one of:

a personal identification number;
a fingerprint scan;
a voice print;
a face scan; or
a retinal scan.

4. The method of claim 2, wherein the request to extend the time period associated with the privilege comprises a verbal response.

5. The method of claim 1, further comprising monitoring usage of the privilege.

6. The method of claim 5, wherein monitoring the usage of the privilege comprises tracking time after provisioning the privilege.

7. The method of claim 6, wherein determining, based on the time period, whether the privilege is expiring within the period of time comprising comparing a tracked time to the time period.

8. The method of claim 1, further comprising parsing a database to identify a telephone number associated with the second computing device.

9. The method of claim 1, further comprising identifying suspicious activity based on monitoring usage of the privilege.

10. The method of claim 9, further comprising in response to identifying suspicious activity, transmitting another notification to the first and the second computing devices that the privileged identity management system requires re-authentication of the first user.

11. The method of claim 1, further comprising prior to extending the time period associated with the privilege, receiving an authentication identifier associated with the first user to authenticate the first user, wherein the time period associated with the privilege is extended based on the authentication of the first and the second users and the second approval.

12. A privileged identity management system comprising:
a processor; and
a memory including instructions, which when executed by the processor, cause the system to:
receive, from a first computing device associated with a first user, a request for a privilege for the first user, the request including a time period related to an expiration of the privilege and contact information of a second computing device associated with a second user for receiving communications regarding the privilege;
transmit, to the second computing device, a first request for approval of the request for the privilege;
receive, from the second computing device, a first approval of the first request, the first approval comprising an authentication identifier associated with the second user to authenticate the second user;
based on the first approval and an authentication of the second user, provide the privilege to the first user;
determine an expiration time when the privilege will lapse;
when a time is within a predetermined time period of the expiration time, transmit, to the first and to the second computing devices, a notification indicating the impending expiration of the privilege;
based on a request to extend the expiration time associated with the privilege, transmit, to the second computing device, a second request for approval of the extension;
receive, from the second computing device, a second approval to extend the expiration time associated with the privilege, the second approval including the authentication identifier; and
based on the second approval and an authentication of the second user, extend the expiration time associated with the privilege.

13. The privileged identity management system of claim 12, wherein the notification transmitted to the first and the second computing devices each comprises at least one of a phone call, a text message, or an electronic mail.

14. The privileged identity management system of claim 12, wherein the authentication identifier associated with the second user comprises at least one of:
a personal identification number;
a fingerprint scan;
a voice print;
a face scan; or
a retinal scan.

15. A computer readable storage device storing instructions, which when executed by a processing unit, cause a privileged identity management system to:
receive, from a first computing device associated with a first user, a request for a privilege for the first user;
send, to a second computing device associated with a second user, a request for approval of the request for the privilege;
receive, from the second computing device, a first approval of the request;
based on the first approval, provision the privilege to the first user;
based on a determination that the privilege is expiring within a first time period, transmit
a notification to the first and the second computing devices indicating the privilege will expire within the first time period;
receive an authentication identifier associated with the first user to authenticate the first user,
based on an authentication of the first user, receive a second approval from the second computing device to extend the privilege, wherein the second approval includes a second time period for expiration of the privilege and an authentication identifier associated with the second user to authenticate the second user; and based on the second approval and an authentication of the second user, extend the privilege for the second time period.

16. The computer readable storage device of claim 15, further comprising instructions, which when executed by the processing unit, cause the privileged identity management system to:
 monitor usage of the privilege;
 identify suspicious activity based on monitoring the usage of the privilege; and
 in response to identifying suspicious activity, communicate a notification to the second computing device that the privileged identity management system requires re-authentication of the first user.

17. The computer readable storage device of claim 15, wherein the request for the privilege comprises one or more of:
 a verbal request;
 an image communication;
 a text communication;
 a gesture; or
 brain activity.

18. The computer readable storage device of claim 15, further comprising instructions, which when executed by the processing unit, cause the privileged identity management system to send, to a third computing device associated with the first user, the notification indicating the privilege will expire within the first time period, wherein the authentication identifier associated with the first user is received from the third computing device.

19. The computer readable storage device of claim 18, wherein the request for the privilege includes contact information of the third computing device to enable the third computing device to receive communications regarding the privilege.

20. The computer readable storage device of claim 19, wherein the communications regarding the privilege comprise at least one of:
 a text message;
 an electronic mail message;
 an image message; or
 a telephone call.

\* \* \* \* \*